(12) United States Patent
Mitsuyasu

(10) Patent No.: US 9,573,594 B2
(45) Date of Patent: Feb. 21, 2017

(54) VEHICLE CONTROL SYSTEM

(75) Inventor: Masaki Mitsuyasu, Kawasaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 182 days.

(21) Appl. No.: 14/410,717

(22) PCT Filed: Jun. 27, 2012

(86) PCT No.: PCT/JP2012/066343
§ 371 (c)(1),
(2), (4) Date: Dec. 23, 2014

(87) PCT Pub. No.: WO2014/002207
PCT Pub. Date: Jan. 3, 2014

(65) Prior Publication Data
US 2015/0191168 A1 Jul. 9, 2015

(51) Int. Cl.
| | | |
|---|---|---|
| B60W 30/14 | (2006.01) | |
| B60W 10/02 | (2006.01) | |
| B60W 10/06 | (2006.01) | |
| F16D 48/02 | (2006.01) | |
| F16D 41/08 | (2006.01) | |
| F02D 41/08 | (2006.01) | |
| F02D 41/12 | (2006.01) | |
| F02D 41/00 | (2006.01) | |
| B60W 30/18 | (2012.01) | |
| F02N 11/08 | (2006.01) | |
| F02D 13/06 | (2006.01) | |
| F02D 29/02 | (2006.01) | |
| B60W 20/00 | (2016.01) | |

(Continued)

(52) U.S. Cl.
CPC .......... *B60W 30/143* (2013.01); *B60W 10/02* (2013.01); *B60W 10/06* (2013.01); *B60W 20/00* (2013.01); *B60W 30/18072* (2013.01); *F02D 13/06* (2013.01); *F02D 29/02* (2013.01); *F02D 41/0002* (2013.01); *F02D 41/08* (2013.01); *F02D 41/123* (2013.01); *F02N 11/0833* (2013.01); *F16D 48/02* (2013.01); *F16D 48/062* (2013.01); *B60W 2030/1809* (2013.01); *B60W 2510/0638* (2013.01); *B60W 2520/10* (2013.01);
(Continued)

(58) Field of Classification Search
CPC ...... B60W 10/02; B60W 10/06; B60W 30/14; B60W 30/143; B60W 30/18072; B60W 2030/18081; B60W 2030/1809; B60W 2510/0638; B60W 2520/10; F16D 2500/10412; F16D 2500/50227; F16D 2500/5045; F16D 2500/5085; F16D 2500/3144; F16D 2500/3067; F16D 2500/3108; F02D 13/06; F02D 13/0203; F02D 41/08; F02D 41/123; F02D 2200/602; F02D 2200/101; F02D 2200/501; Y02T 10/18; Y02T 10/42; Y02T 10/48
See application file for complete search history.

(56) References Cited

U.S. PATENT DOCUMENTS 4,188,933 A 2/1980 Iizuka

FOREIGN PATENT DOCUMENTS

| JP | 54-069222 U1 | 10/1979 |
|---|---|---|
| JP | 2005-140076 A | 6/2005 |

(Continued)

*Primary Examiner* — Jacob S Scott
(74) *Attorney, Agent, or Firm* — Andrews Kurth Kenyon LLP

(57) ABSTRACT

A vehicle control system for a vehicle including an engine having a plurality of cylinders, a power transmission route between the engine and drive wheels and a clutch device for selectively connecting and disconnecting the power transmission route. The vehicle control system can disconnect the power transmission route during running to allow the vehicle to coast. The vehicle control system including an electronic control unit (ECU) for detecting, among other things, vehicle speed and operation of an accelerator by a driver, as well as for executing and controlling various components of the vehicle.

4 Claims, 5 Drawing Sheets

(51) Int. Cl.
*F16D 48/06* (2006.01)
*F02D 41/02* (2006.01)

(52) U.S. Cl.
CPC ......... *B60W 2540/10* (2013.01); *F02D 41/022* (2013.01); *F02D 2041/001* (2013.01); *F02D 2041/0012* (2013.01); *F02D 2200/101* (2013.01); *F02D 2200/501* (2013.01); *F02D 2200/602* (2013.01); *F16D 2500/10412* (2013.01); *F16D 2500/3067* (2013.01); *F16D 2500/30401* (2013.01); *F16D 2500/3108* (2013.01); *F16D 2500/3144* (2013.01); *F16D 2500/3166* (2013.01); *F16D 2500/5043* (2013.01); *F16D 2500/5045* (2013.01); *F16D 2500/5085* (2013.01); *F16D 2500/50227* (2013.01); *F16D 2500/7041* (2013.01); *Y02T 10/18* (2013.01); *Y02T 10/42* (2013.01); *Y02T 10/48* (2013.01)

(56) References Cited

FOREIGN PATENT DOCUMENTS

| | | |
|---|---|---|
| JP | 2010-247773 A | 11/2010 |
| JP | 2011-106378 A | 6/2011 |
| JP | 2011-163535 A | 8/2011 |

| Vehicle Speed | Low | Middle | | High |
|---|---|---|---|---|
| Deceleration Demand | Extremely Weak | Weak | Moderate | Strong |
| Clutch | OFF | ON | ON | ON |
| Fuel Cut | without F/C | Execute F/C | Execute F/C | without F/C |
| Cylinder Deactivation | 0 | All Cylinders | 50% | 0 |

VEHICLE CONTROL SYSTEM

CROSS-REFERENCE TO RELATED APPLICATION

This is a national phase application based on the PCT International Patent Application No. PCT/JP2012/066343 filed Jun. 27, 2012, the entire contents of which are incorporated herein by reference.

TECHNICAL FIELD

The present invention relates to a control system for a vehicle that is provided with a clutch for selectively connect and disconnect a prime mover to/from drive wheels through a power transmission route, and that is allowed to coast by bringing the clutch into disengagement.

BACKGROUND ART

In order to improve fuel economy, a fuel cut-off control for stopping fuel supply to an engine during running, and a coasting control for coasting the vehicle by disconnecting the engine from a drive line during running have been in recent years. Specifically, the fuel cut-off is carried out to stop fuel supply to the engine given that an accelerator is returned to close an accelerator valve completely, and that an engine speed is higher than an idling speed so that a vehicle speed is higher than a predetermined speed. Under the fuel cut-off control, although the combustion of fuel in the engine is stopped, the engine is still rotating by a torque from the drive wheels. Therefore, a braking torque resulting from a pumping loss of the engine and a friction torque is applied to the drive wheels. Consequently, an engine braking force is applied to the vehicle.

For example, the coasting control is carried out when the accelerator is returned during running to coast the vehicle without rotating the engine passively by bringing the clutch into disengagement disposed between the engine and the drive wheels. Therefore, under the coasting control, the engine braking force will not be applied to the vehicle so that the vehicle is allowed to coast utilizing an inertia energy.

The coasting control may be carried out not only by stopping the fuel supply to the engine but also without stopping the fuel supply to the engine while lowering the engine speed close to the idling speed. In case of carrying out the coasting control while stopping the engine, the fuel will not be consumed during coasting the vehicle so that the fuel economy can be improved significantly. By contrast, in case of carrying out the coasting control without stopping the engine, the fuel economy will not be improved as the case of stopping the engine. In this case, however, it is not necessary to arrange additional devices for insuring a required oil pressure under cessation of the engine such as an electric oil pump, a hydraulic accumulator etc. Therefore, the coasting control can be carried out easily without requiring additional modification of the vehicle and additional equipment. In the following explanation, the coasting control without stopping the engine will be called especially the "neutral coasting control" or the "N coasting control".

For example, Japanese Patent Laid-Open No. 2011-163535 describes a controller for mechanical automatic transmission configured to carry out the coasting control. According to the teachings of Japanese Patent Laid-Open No. 2011-163535, an input shaft of a geared transmission is connected to an output shaft of an engine though a friction clutch, and an alteration of engagement state of the clutch and a speed change operation of the transmission are carried out automatically. To this end, a coasting of the vehicle is determined based on a vehicle speed, an execution of a speed change of the transmission, and an accelerator opening. Given that the coasting of the vehicle is continued for a predetermined period of time, the clutch is brought into disengagement and the vehicle speed is lowered to an idling speed. In case the vehicle is not coasting after disengaging the clutch, a target gear stage of the transmission is established according to the vehicle speed and the accelerator opening, and then the clutch is brought into engagement.

Japanese Patent Laid-Open No. 2005-140076 discloses a control device for a vehicle mounting an automatic transmission comprising a torque convertor having a lockup clutch. In case a driving condition of the vehicle meets a predetermined requirement, fuel cut-off is carried out to stop supplying the fuel to the engine. When the lockup clutch is in an engaging state or a slipping state, the fuel supply is stopped earlier than when the lockup clutch is in the engaging state. In addition, according to Japanese Patent Laid-Open No. 2005-140076, after a predetermined delay time since the lockup clutch has been released, fuel supply to a plurality of cylinders of the engine is stopped serially.

For example, Japanese Patent Laid-Open No. 2010-24773 describes a control for the neutral coasting. The coasting controller taught by Japanese Patent Laid-Open No. 2010-24773 is configured to bring the clutch disposed between the engine and the driving wheels into disengagement when the engine is not involved in propelling the vehicle, and to allow the vehicle by idling the engine. In addition, the coasting controller is further configured to terminate the coasting control regardless of a satisfaction of the terminating condition if a difference between the vehicle speed at the commencement of the coasting control and the current vehicle speed exceeds a predetermined threshold value during execution of the coasting control.

Japanese Patent Laid-Open No. 2011-106378 describes a vehicular controller configured to carry out a cylinder deactivation of an engine comprising a plurality of cylinders. The vehicular controller taught by Japanese Patent Laid-Open No. 2011-106378 is configured to execute a deceleration control by altering a speed ratio and number of deactivated cylinders based on the required deceleration during stopping fuel supply to the engine under the idle off state. Japanese Patent Laid-Open No. 2011-106378 further describes a fact that a pumping loss is reduced with an increase in the deactivated cylinders and that the deceleration is changed in a mild manner during the deceleration control.

As described, according to the teachings of Japanese Patent Laid-Open No. 2011-163535, the friction clutch is brought into disengagement during the coasting of vehicle so that the vehicle is allowed to be propelled by inertia force, and the engine speed is lowered to the idling speed. Consequently, fuel economy of the vehicle is improved. During the coasting control, however, a power transmission between the engine and the drive wheels is interrupted. In this case, if the vehicle is running down a downslope, an engine brake will not be applied to the vehicle and the vehicle speed is continuously increased. That is, the driver may not feel deceleration of the vehicle. Thus, according to the conventional coasting control taught e.g., by Japanese Patent Laid-Open No. 2011-163535, the driver may feel uncomfortable feeling or fear if the vehicle enter into a downgrade and the vehicle speed is therefore increased.

DISCLOSURE OF THE INVENTION

The present invention has been conceived noting the foregoing technical problem, and it is therefore an object of the present invention is to provide a vehicle control system for carrying out the coasting control of a vehicle by interrupting a power transmission between a prime mover and drive wheels, without providing uncomfortable feeling or fear with a driver or passenger(s).

The vehicle control system of the present invention is applied to a vehicle comprising an engine having a plurality of cylinders, a power transmission route between the engine and drive wheels and a clutch device adapted to selectively connect and disconnect the power transmission route, and the vehicle control system is configured to disconnect the power transmission route during running to allow the vehicle to coast. In order to achieve the above-explained objectives, according to the present invention, the vehicle control system is provided with: a means that detects a vehicle speed; a means that detects an operation of an accelerator by a driver; a means that detects a speed of the engine; an execution means that executes a coasting control when an operating amount of an accelerator is reduced to be smaller than a predetermined value during running, by bringing the clutch device into disengagement to disconnect the power transmission route while controlling the engine in a manner such that the engine speed is reduced to be lower than an idling speed that is lower than the engine speed of a case in which the coasting control is not carried out; and a deactivation means that connects the power transmission route by bringing the clutch device into engagement while stopping fuel supply to the engine and deactivating intake valves and exhaust valves of the cylinders, when the vehicle speed exceeds a reference speed or an increasing amount of the vehicle speed exceeds a reference value.

The deactivation means is further configured to reduce number of the intake valves and the exhaust valves of the cylinders to be deactivated with an increase in the vehicle speed.

The deactivation is further configured to stop the fuel supply to the engine without deactivating the intake valves and the exhaust valves, when the vehicle speed exceeds an upper limit speed that is higher than the reference speed or an increasing amount of the vehicle speed exceeds a predetermined upper limit value that is larger than the reference value.

Thus, according to the present invention, the coasting control of the vehicle is carried out upon reduction in an operating amount of the accelerator to be smaller than the predetermined value during running. Specifically, the coasting control is achieved by disengaging the clutch device to disconnect the power transmission route between the engine and the drive wheels, while reducing the engine speed to the idling speed. Therefore, a cruising distance of the vehicle can be extended so that fuel economy can be improved.

In addition, the clutch device is brought into engagement to terminate the coasting control, under a condition that the vehicle speed is higher than a predetermined speed or an increasing amount of vehicle speed is larger than a predetermined value during the coasting. In this situation, the fuel cut-off is carried out to stop fuel supply to the engine and the intake and exhaust valves of cylinders are deactivated. As mentioned above, when the fuel cut-off of the engine is carried out during running, the engine braking force resulting from a pumping loss of the engine and a friction torque is applied to the vehicle. In addition, according to the present invention, deactivation of the intake and exhaust valves of cylinders is executed under the situation that the coasting control is terminated while carrying out the fuel cut-off. Consequently, an engine braking force, in other words, a braking torque being applied to the vehicle is lightened.

Thus, the engine braking force applied to the vehicle can be controlled by altering number of the intake and exhaust valves of the cylinders to be deactivated. For this reason, when the coasting control is terminated as a result of increment of the vehicle speed during coasting, that is, during running the vehicle while retuning the accelerator pedal, the vehicle can be decelerated by the engine braking force thus adjusted appropriately so that the driver or passenger(s) is/are allowed to feel appropriate deceleration feeling rather than uncomfortable feeling or fear.

In addition, according to the present invention, number of intake valves and exhaust valves of the deactivated cylinders is reduced with an increase in the vehicle speed when terminating the coasting control while carrying out the fuel cut-off of the engine as a result of increment of the vehicle speed. Consequently, a pumping loss of the engine is increased so that the engine braking force is increased. For this reason, even if strong deceleration is demand in the high speed region, the vehicle can be decelerated according to need by the engine braking force thus increased. As a result, the driver is allowed to feel appropriate decelerating feeling.

In addition, if vehicle speed is increased to be higher than the predetermined level or an increasing amount of the vehicle speed exceeds a predetermined value when terminating the coasting control, only the fuel cut-off of the engine is carried out without deactivating the intake valves and the exhaust valves of the cylinders. In this case, the maximum engine braking force is applied to the vehicle as a result of carrying out the fuel cut-off. That is, the strong deceleration demanded within the high speed range can be achieved by the engine braking force thus increased. As a result, the driver is allowed to feel appropriate decelerating feeling.

BEST MODE FOR CARRYING OUT THE INVENTION

Figure 1:
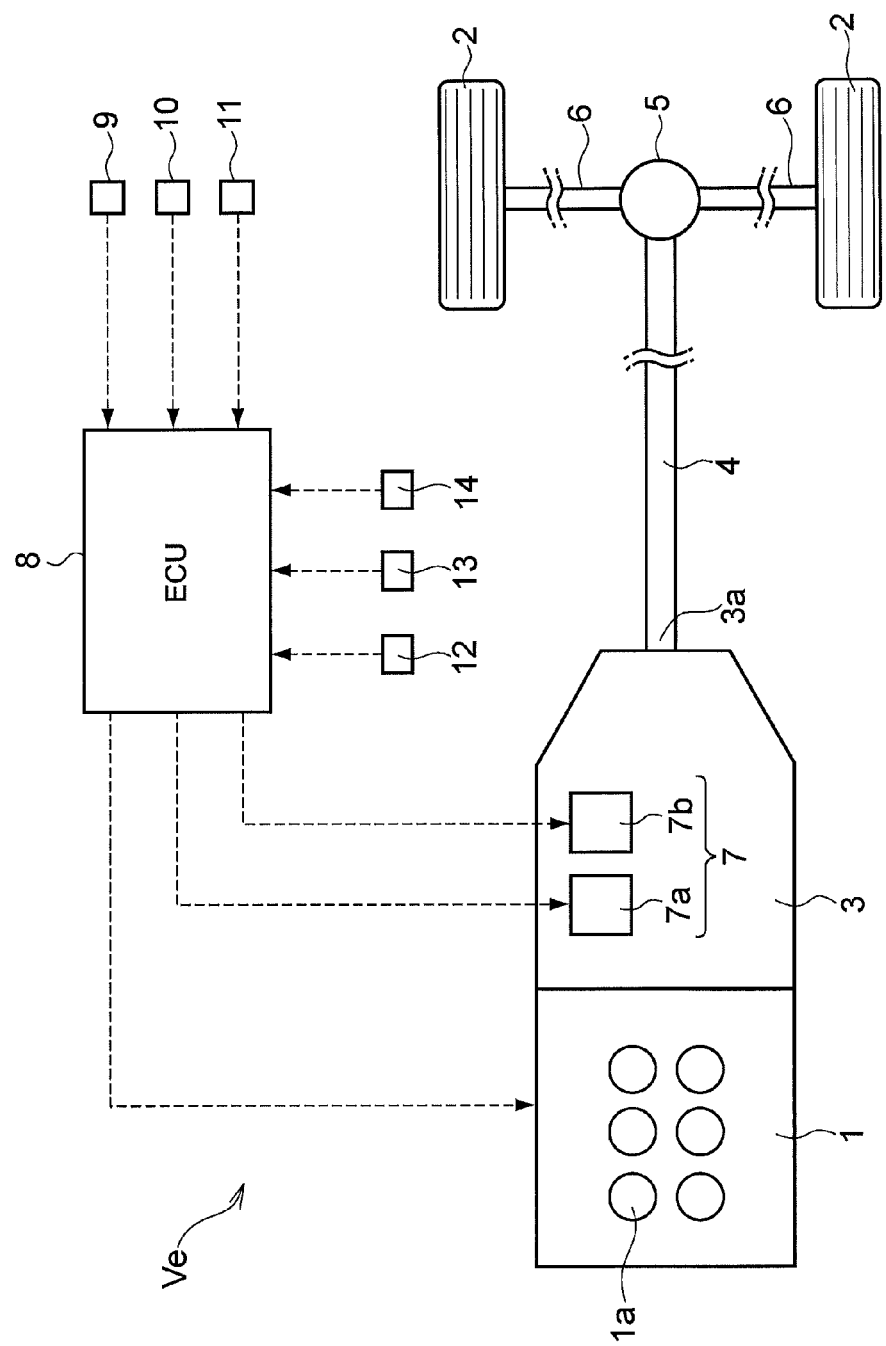
FIG. 1 is a view schematically showing an example of a drive line and a control line of the vehicle to which the control system of the present invention is applied.

Next, the present invention will be explained in more detail with reference to the accompanying drawings. FIG. 1 shows a drive line and a control line of the vehicle to which the control system of the present invention is applied. As shown in FIG. 1, the vehicle Ve is comprised of an engine 1, and an automatic transmission 3 connected to an output side of the engine 1 to transmit a power of the engine 1 to drive wheels 2. Specifically, the automatic transmission 3 is disposed on the output side of the engine 1, and an output shaft 3a of the automatic transmission 3 is connected to the drive wheels 2 to transmit power therebetween through a propeller shaft 4, a differential gear 5 and a drive shaft 6. Thus, FIG. 1 shows an example of rear-drive layout of the vehicle Ve in which the engine 1 is connected to the rear drive wheels 2 through the propeller shaft 4. However, the control system of the present invention may also be applied to a front drive vehicle and a four-wheel drive vehicle.

The engine 1 serves as a prime mover of the vehicle Ve, and for example, an internal combustion engine for generating a power by burning fuel such as a gasoline engine, a diesel engine a natural gas engine and etc. According to the example shown in FIG. 1, the gasoline engine is used as the engine 1, and the engine 1 is comprised of an electronic throttle valve an opening degree thereof is controlled electrically, and a fuel injector an injecting amount thereof is controlled electrically. Therefore, the engine 1 can be operated in an optimally fuel efficient manner by electrically controlling a rotational speed with respect to a predetermined load.

The engine 1 is comprised of a plurality of cylinders 1a in which a piston is reciprocated by burning fuel. An operation mode of the engine 1 can be selected depending on a situation from an all-cylinder mode where all cylinders 1a are activated and a cylinder deactivation mode where some of the cylinders 1a are deactivated.

The automatic transmission 3 is adapted to transmit a torque of the engine 1 to the drive wheels 2 while carrying out a speed change. For example, a geared automatic transmission (AT), a belt-driven or toroidal continuously variable transmission (CVT), a dual-clutch automatic transmission (DCT) based on a geared manual transmission, an automatic clutch manual transmission (AMT) and so on may be used as the automatic transmission 3. The vehicle Ve is further provided with a clutch 7 adapted to selectively allow a power transmission between the engine 1 and the drive wheels 2, irrespective of a type of the automatic transmission 3, and irrespective of a drive system such as a front drive system, a rear drive system and a four wheel drive system.

According to the example shown in FIG. 1, a geared automatic transmission having a planetary gear unit is employed as the automatic transmission 3. As the conventional AT, the automatic transmission 3 is comprised of a plurality of planetary gear units (not shown), a forward clutch 7a engaged to establish a forward stage, and a reverse brake 7b engaged to establish a reverse stage. Optionally, the automatic transmission 3 may be provided with an additional clutch or brake to be engaged to establish a predetermined forward stage. Accordingly, the automatic transmission 3 is brought into a neutral stage by disengaging both of the forward clutch 7a and the reverse brake 7b. As a result of thus disengaging the forward clutch 7a and the reverse brake 7b, the engine 1 is disconnected from the drive wheels 2 so that the power transmission therebetween is interrupted. Accordingly, in the example shown in FIG. 1, the clutch 7 comprised of the forward clutch 7a and the reverse brake 7b serves as the clutch of the invention.

As described, the CVT may be used as the automatic transmission 3. The conventional CVT is comprised of a belt driven transmission and a torque reversing device for reversing a direction of the torque transmitted to the drive wheels 2 between the forward direction and the backward direction. Specifically, the torque reversing device is comprised of a forward clutch engaged to establish the forward stage and a reverse clutch engaged to establish the reverse stage. Therefore, the power transmission between the engine 1 and the automatic transmission 3 is interrupted by disengaging both of the forward clutch and the reverse brake. That is, a neutral stage of the automatic transmission 3 is established. In this case, the forward clutch and the reverse brake serve as the clutch of the invention.

Given that the DCT is used as the automatic transmission 3, the power transmission between the engine 1 and the automatic transmission 3 is interrupted by disengaging both of the clutches of the DCT. That is, a neutral stage of the automatic transmission 3 is established. In this case, the two clutches of the DCT serve as the clutch of the invention.

Given that the AMT is used as the automatic transmission 3, the power transmission between the engine 1 and the automatic transmission 3 is interrupted by disengaging a clutch of the conventional manual transmission device and the engine 1. That is, a neutral stage of the automatic transmission 3 is established. In this case, the above-explained clutch serves as the clutch of the invention.

The control system of the present invention may be applied not only to a hybrid vehicle in which the prime mover is comprised of an internal combustion engine and an electric motor, but also to an electric vehicle in which only the electric motor is used as the prime mover. In order to selectively connect and disconnect the power transmission route between the prime mover and the drive wheels 2, according to the present invention, the vehicle Ve is provided with the clutch 7 irrespective of a kind of the prime mover such as the engine 1, the electric motor, and a hybrid drive unit comprised of the engine 1 and the electric motor. For example, a friction clutch and a dog clutch may be used as the clutch 7, and in case of using the friction clutch, any of a wet type and a dry type friction clutches may be used. That is, any kinds of clutches may be used as the clutch 7 to selectively allow and interrupt a power transmission route between the prime mover such as the engine 1, the electric motor, and a hybrid drive unit and the drive wheels 2 to transmit power therebetween.

Given that the vehicle Ve is the hybrid vehicle or the electric vehicle having the electric motor as the prime mover, a braking force can be applied to the vehicle Ve by carrying out a regeneration control of the electric motor while engaging the clutch 7. Specifically, a braking torque can be applied to the drive wheels 2 to decelerate the vehicle Ve during running by operating the electric motor as a generator while engaging the clutch 7.

In order to control an operating condition of the engine 1 and engagement state of the clutch 7, the vehicle Ve is provided with an electronic control unit (ECU) 8 as a controller that is configured to carry out a calculation based on input data and preinstalled data, and to output a calculation result in the form of a command signal. For example, detection signals from a wheel speed sensor 9 adapted to detect a rotational speed of each wheel of the vehicle Ve, an accelerator sensor 10 adapted to detect a depressing angle or a depressing amount of an accelerator pedal, a brake sensor 11 adapted to detect a depressing angle or a depressing amount of a brake pedal, an engine speed sensor 12 adapted to detect a speed of the engine 1, a throttle sensor 13 detecting the opening degree of the throttle valve of the engine 1, an inclination sensor 14 adapted to detect an inclination angle of the vehicle Ve and so on are sent to the electronic control unit 8. Based on those signals, the electronic control unit 8 sends a command signals to the engine 1 to control the operating condition, and to the clutch 7 to control the engagement state.

Given that the electric motor is used as the prime mover of the vehicle Ve, a detection signal from a speed sensor for the electric motor or a resolver is additionally sent to the electronic control unit 8. In this case, the electronic control unit 8 sends a command signal to the electric motor to control the operating condition.

In order to improve a fuel economy of the vehicle Ve thus structured, the control system of the present invention carries out the coasting control of the vehicle Ve by bringing the clutch 7 into disengagement during running. According to the present invention, specifically, the coasting control is carried out to cutoff a power transmission route between the engine 1 and the drive wheel 2 by disengaging the clutch 7, under a condition that the accelerator pedal is not depressed or reduced to be smaller than the predetermined value, in other words, completely returned while the vehicle Ve is moving at a speed higher than a predetermined speed. Under the neutral coasting control, however, the engine 1 will not be stopped. That is, under the neutral coasting control, although the speed of the engine 1 is lowered almost to an idling speed, the fuel combustion is carried on.

Thus, under the neutral coasting control, a power transmission between the engine 1 and the drive wheel 2 is interrupted. Therefore, a braking torque resulting from a pumping loss of the engine 1 and a drag torque will not be applied to the drive wheels 2 of the vehicle Ve. In other words, an engine braking force will not be applied to the vehicle Ve. Therefore, under the coasting, a possible coasting distance achieved by an inertia energy of the vehicle Ve is extended. Consequently, a cruising distance of the vehicle Ve per unit of fuel can be extended so that the fuel economy of the vehicle Ve can be improved.

Under the neutral coasting control, the fuel economy of the vehicle Ve can be further improved if the fuel combustion of the engine 1 is stopped while disengaging the clutch 7. However, if the fuel combustion of the engine 1 is stopped, a power for actuating auxiliaries such as an oil pump and a compressor for an air conditioner, and a power for actuating a hydraulic power steering system and a brake system will be lost. In this case, therefore, a substitute power source (e.g., an electric motor) and a hydraulic accumulator are required for the case of cessation of the engine 1. By contrast, given that the engine 1 is not stopped under the neutral coasting control, the power for driving those auxiliaries and the power steering and the brake systems will not be lost. In this case, therefore, the neutral coasting control can be carried out easily in the conventional vehicles without requiring the additional power source.

For example, if the foregoing neutral coasting control is carried out while the vehicle Ve is running down a downslope, the vehicle speed would be increased. As described, the engine brake will not be applied to the vehicle during the neutral coasting control so that the driver may not feel a decelerating satisfactory. If the vehicle speed is continuously increased during coasting, the driver may feel uncomfortable feeling or fear. In order to avoid such disadvantage, the control system of the present invention is configured to carry out the neutral coasting of the vehicle Ve without providing uncomfortable feeling or fear with the driver or passenger(s).

Figure 2:
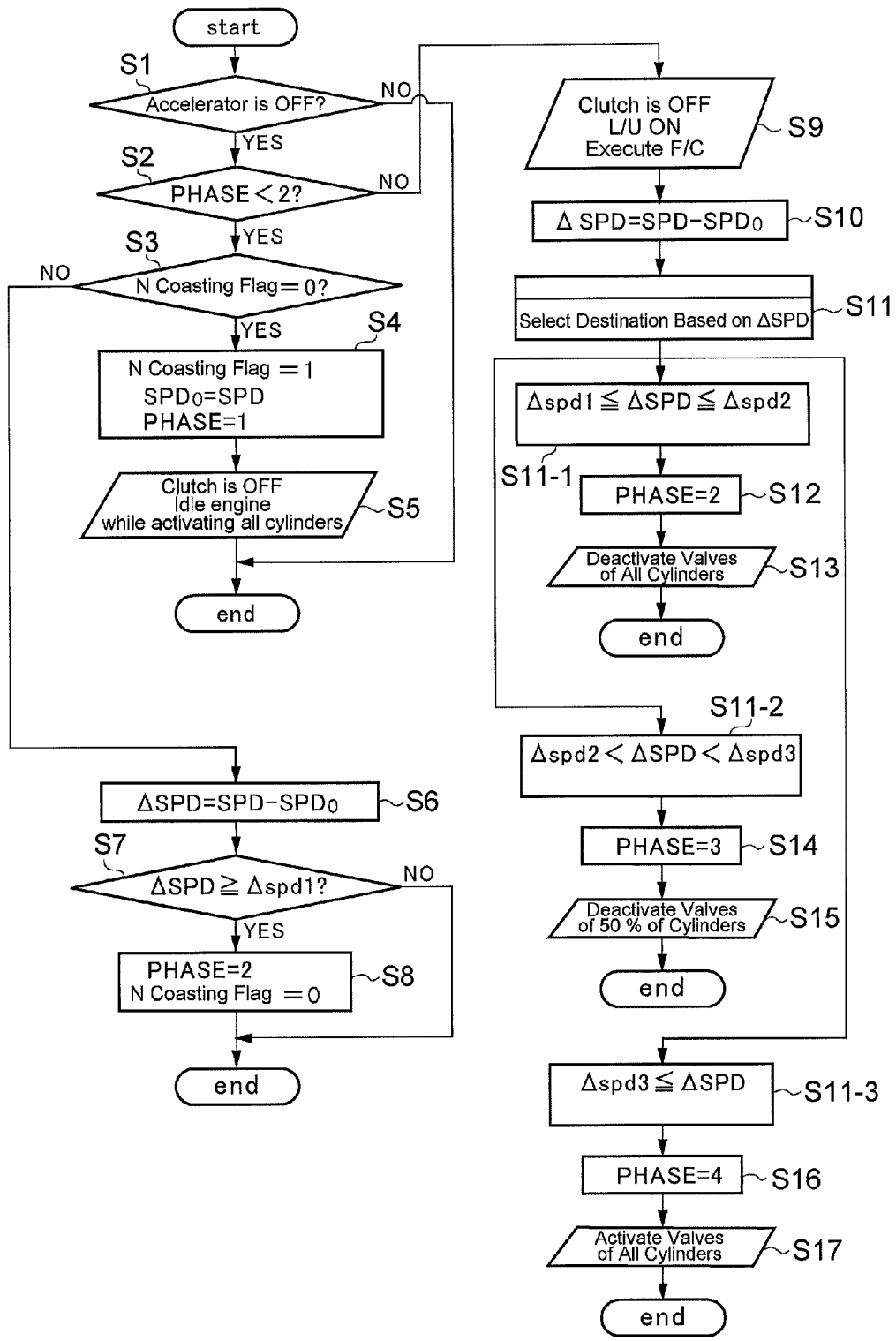
FIG. 2 is a flowchart showing one example of the neutral coasting control carried out by the control system of the present invention.
Figure 3:
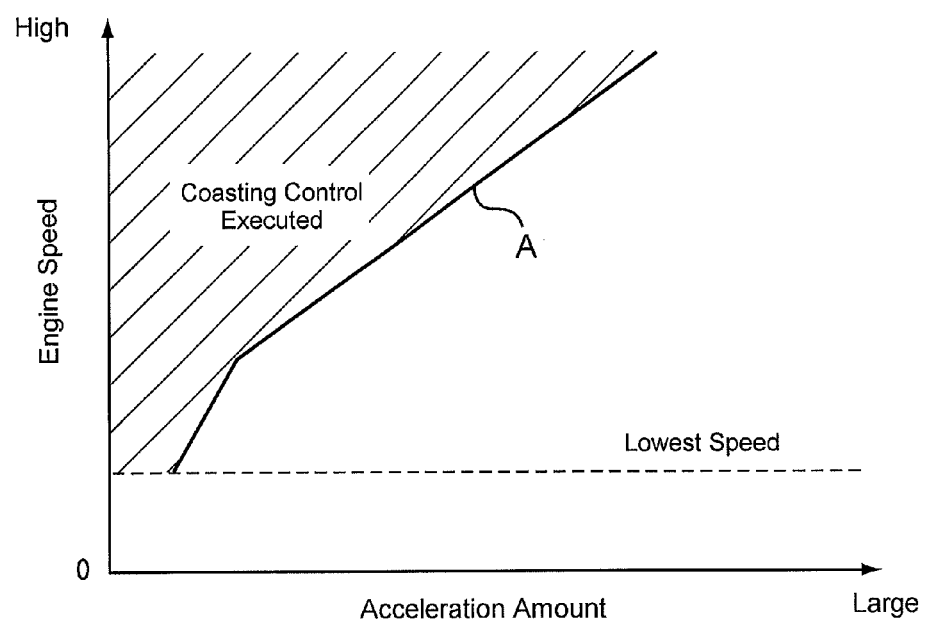
FIG. 3 shows one example of a map used in the neutral coasting control according to the present invention.

An example of such control is shown in FIG. 2, and the routine shown therein is repeated at predetermined short intervals. First of all, it is determined whether or not the accelerator is "OFF", that is, whether or not the operating amount of the accelerator is reduced to be zero or smaller than the reference value (at step S1). According to the present invention, the neutral coasting control is triggered by the fact that the operating amount of the accelerator is reduced to zero or to be smaller than a predetermined value. Specifically, the fact that the operating amount of the accelerator is reduced to zero or to be smaller than a predetermined value is a condition to determine whether or not the accelerator pedal that has been depressed by the driver is released and returned. The reference value of the operating amount of the accelerator used to determine to execute the neutral coasting control is not necessarily set to be zero. For example, as indicated in the map shown in FIG. 3, the neutral coasting control is commenced when the operating amount of the accelerator is reduced to be smaller than a reference value A. Optionally, as shown in FIG. 3, the reference value A may be altered in accordance with the engine speed Ne.

If the accelerator is not "OFF", that is operating amount of the accelerator is still larger than the reference value so that the answer of the step S1 is NO, the routine is ended without carrying out any specific controls. By contrast, if the accelerator is "OFF", that is, if the operating amount of the accelerator has been reduced to be smaller than the reference value so that the answer of step S1 is YES, the routine advances to step S2 to determine whether or not a phase flag adapted to represent a control phase of this routine is smaller than 2. Here, it is to be noted that the example shown in FIG. 2 is comprised of four phases from the phase "1" to the phase "4", and that the phase flag is set to "0" in the beginning of this routine.

Thus, since the phase flag is smaller than "2" in the beginning of the routine so that the answer of the step S2 is YES, the routine advances to step S3 to determine whether or not an execution flag of the neutral coasting control is "0". The execution flag of the neutral coasting control is set to "1" to execute the neutral coasting control, and set to "0" to terminate the neutral coasting control. Likewise, the execution flag of the neutral coasting control is set to "0" in the beginning of this routine.

Since the execution flag of the neutral coasting control is set to "0" in the beginning of the routine so that the answer of the step S3 is YES, the routine advances to step S4. At step S4, specifically, the execution flag of the neutral coasting control is set to "1", a current detected vehicle speed SPD is saved as an initial vehicle speed $SPD_0$ at a commencement of the neutral coasting control, and the phase flag are set to "1". Then, a command signal to bring the clutch 7 into disengagement and a command signal to idle the engine 1 are outputted (at step S5). Consequently, the clutch 7 is brought into disengagement and the engine 1 is operated at the idling speed so that the neutral coasting is achieved.

Specifically, the idling speed is lower than a normal speed range of the engine 1 propelling the vehicle Ve while engaging the clutch device 7, and which is the lower limit speed at which the engine 1 operated free from the load is allowed to rotate autonomously.

After commencing the neutral coasting control, the routine is ended. If the execution flag of neutral coasting control is set to "1" at the step S4 so that the answer of the aforementioned step S3 is NO, the routine advances to step S6 to obtain an increasing amount of vehicle speed ΔSPD. Specifically, the increasing amount of vehicle speed ΔSPD is a deviation between the initial vehicle speed $SPD_0$ and the current vehicle speed SPD.

Then, it is determined whether or not the increasing amount of vehicle speed ΔSPD is equal to or larger than the first reference value Δspd1 (at step S7). The first reference value Δspd1 is a reference value used to determine an increasing amount of the vehicle speed since the commencement of the neutral coasting for the purpose of estimating a magnitude of deceleration to be demanded as a result of increase in vehicle speed. Accordingly, the first reference value $\Delta spd1$ serves as the "predetermined increasing amount of vehicle speed" of the present invention. The first reference value $\Delta spd1$ may be determined based on an experiment or simulation result.

If the increasing amount of vehicle speed $\Delta SPD$ is smaller than the first reference value $\Delta spd1$ so that the answer of the step S7 is NO, the routine is ended without carrying out any specific controls. By contrast, if the increasing amount of vehicle speed $\Delta SPD$ is equal to or larger than the first reference value $\Delta spd1$ so that the answer of the step S7 is YES, the routine advances to step S8. At step S8, the phase flag is set to "2" and the execution flag of neutral coasting control is set to "0". Then, the routine is ended.

After the phase flag is thus set to "2" at step S8, the answer of step S2 of subsequent routine will be NO so that the routine advances step S9. At step S9, specifically, the clutch 7 is brought into engagement and the fuel cut-off is commenced upon reception of the command signals. Given that a torque converter having a lockup clutch is disposed between the engine 1 and the automatic transmission 3, the lockup clutch is also brought into engagement. Consequently, the neutral coasting control is terminated and the fuel-cut off is carried out to stop fuel supply to the engine 1.

Then, as the aforementioned step S6, a current increasing amount of vehicle speed $\Delta SPD$ is calculated based on a deviation between the initial vehicle speed $SPD_0$ saved at the step S4 and the current vehicle speed SPD (at step S10). Thereafter, a destination step is selected from the following steps based on the increasing amount of vehicle speed $\Delta SPD$ calculated at step S10 (at step S11).

Specifically, if the increasing amount of vehicle speed $\Delta SPD$ calculated is equal to or larger than the first reference value $\Delta spd1$ but equal to or smaller than the second reference value $\Delta spd2$, step S11-1 is selected as the destination and the routine further advances to the step S12. If the increasing amount of vehicle speed $\Delta SPD$ calculated at step S10 is larger than the second reference value $\Delta spd2$ but smaller than the third reference value $\Delta spd3$, step S11-2 is selected as the destination and the routine further advances to the step S14. If the increasing amount of vehicle speed $\Delta SPD$ calculated at step S10 is equal to or larger than the third reference value $\Delta spd3$, step S11-3 is selected as the destination and the routine further advances to the step S16.

The second reference value $\Delta spd2$ is a reference value used to determine an increasing amount of the vehicle speed since the commencement of the neutral coasting in association with the first reference value $\Delta spd1$ and the aftermentioned third reference value $\Delta spd3$, for the purpose of estimating a magnitude of deceleration to be demanded as a result of increase in vehicle speed. Specifically, the second reference value $\Delta spd2$ is determined based on an experiment or simulation result to be larger than the first reference value $\Delta spd1$ but smaller than the third reference value $\Delta spd3$.

Likewise, the third reference value $\Delta spd3$ is a reference value used to determine an increasing amount of the vehicle speed since the commencement of the neutral coasting in association with the first and the second reference values $\Delta spd1$ and $\Delta spd2$, for the purpose of estimating a magnitude of deceleration to be demanded as a result of increase in vehicle speed. Specifically, the third reference value $\Delta spd3$ is determined based on an experiment or simulation result to be larger than the second reference value $\Delta spd2$. Accordingly, the third reference value $\Delta spd3$ serves as the "predetermined upper limit value of increasing amount of the vehicle speed" of the present invention.

At step S12, the phase flag is set to "2", and then intake valves and exhaust valves of all of the cylinders $1a$ of the engine 1 are deactivated upon reception of the command signal (at step S13). In this situation, the fuel cut-off is carried out to stop the combustion of the engine 1, and as a result of thus deactivating all of the intake valves and exhaust valves, a pumping loss of the engine 1 is minimized.

Thus, the control of steps S12 and S13 are executed under the condition that the vehicle speed is slightly increased after the commencement of the neutral coasting control, and that the estimated deceleration demand is relatively small. In this case, therefore, all of the intake valves and exhaust valves are deactivated and the pumping loss of the engine 1 is reduced relatively. After a cessation of an intake valve and an exhaust valve at step S13, the routine is ended.

At step S14, the phase flag is set to "3", and then the intake valves and the exhaust valves of half of the cylinders $1a$ of the engine 1 are deactivated at step S15 upon reception of the command signal. In this situation, the fuel cut-off is carried out to stop combustion of the engine 1. As a result of thus deactivating the intake valves and exhaust valves of half of the cylinders $1a$ while stopping fuel supply to the engine 1, the pumping loss is averaged between that of the case in which the intake valves and exhaust valves of all cylinders $1a$ are deactivated and that of the case in which none of intake valves and exhaust valves of the cylinders $1a$ are deactivated.

That is, the controls of steps S14 and S15 are executed under the condition that the vehicle speed is increased to a certain extent after the commencement of the neutral coasting control and that a certain level of deceleration is demanded. In this case, therefore, the intake valves and exhaust valves of half of the cylinder $1a$ are deactivated to adjust the pumping loss of the engine 1 to an intermediate level. After a deactivation of the intake and exhaust valves of half of the cylinders $1a$ at step S15, the routine is ended.

Thus, at step S15, half of the cylinder $1a$ of engine 1 are deactivated by deactivating the intake valves and exhaust valves thereof. However, number of the cylinders $1a$ to be deactivated may be altered according to need. For example, it is also possible to deactivate one third or of the cylinders $1a$ by altering number of the intake valves and exhaust valves to be deactivated depending on the estimated deceleration demand.

At step S16, the phase flag is set to "4", and in this case, command signals to keep activating the intake valves and the exhaust valves of all of the cylinders $1a$ of the engine 1 are outputted (at step S17). Otherwise, all command signals for deactivating the intake valves and the exhaust valves of all the cylinders $1a$ of the engine 1 are cancelled. That is, the intake valves and exhaust valves of all of the cylinders $1a$ are allowed to be activated and the fuel cut-off is carried out to stop the combustion of the engine 1. In this case, therefore, a pumping loss of the engine 1 is maximized.

The controls of steps S16 and S17 are executed under the condition that the vehicle speed is significantly increased after the commencement of the neutral coasting control, and that the estimated deceleration demand is relatively large. In this case, therefore, all of the intake valves and exhaust valves are activated and the pumping loss of the engine 1 is maximized. After activating all of the intake and exhaust valves at step S17, the routine is ended.

Figures 4, 5:
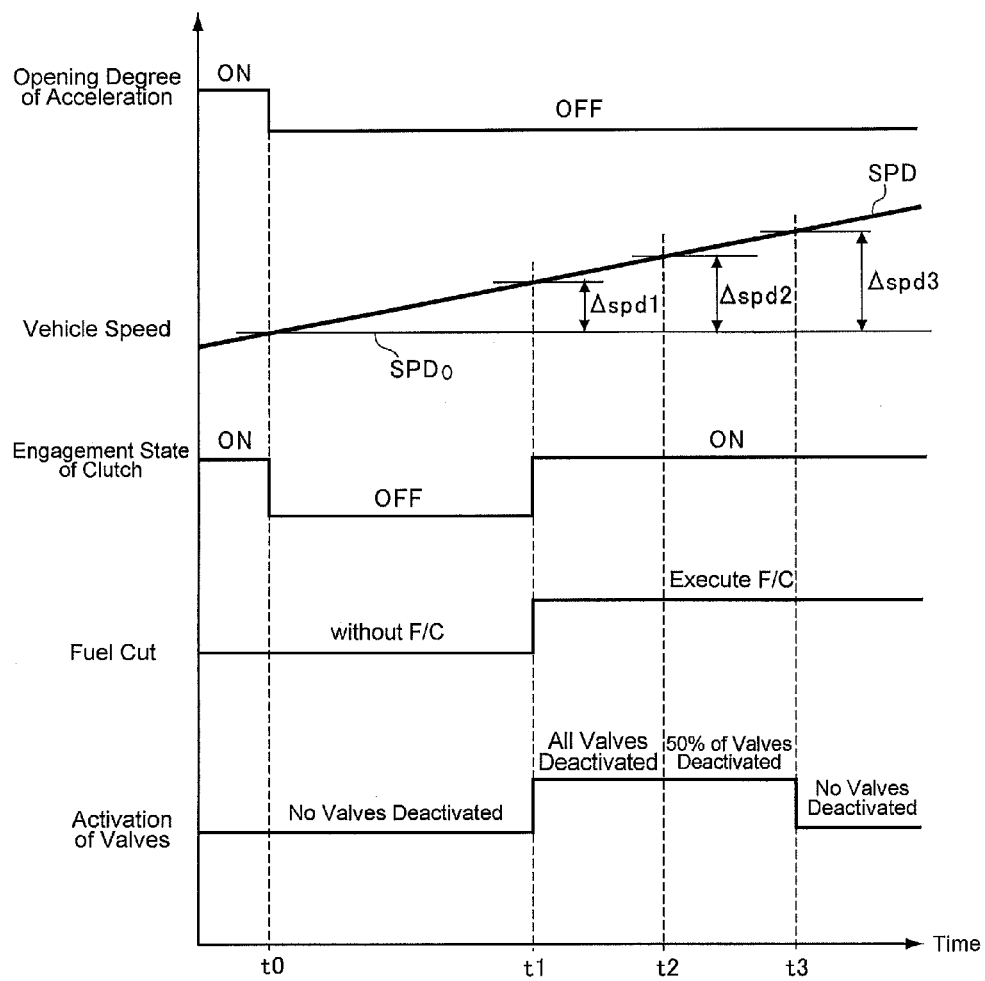
FIG. 4 is a time chart indicating an engagement state of a clutch, an execution of the fuel cut off, and a cessation of an intake valve and an exhaust valve.
FIG. 5 is a table showing another example of the neutral coasting control carried out by the control system of the present invention.

Referring now to FIG. 4, there is shown a time chart indicating an engagement state of the clutch 7, the execution of the fuel cut off, and the activation of the intake valves and the exhaust valves. Specifically, FIG. 4 shows an example in which the neutral coasting control is carried out in the vehicle Ve running on a downslope. As can be seen from FIG. 4, the vehicle speed SPD is gradually increased, and the accelerator is closed as indicated "OFF" at point t0. In this situation, the clutch 7 is brought into disengagement so that the power transmission route between the engine 1 and the drive wheels 2 is disconnected. Consequently, the neutral coasting control is commenced to propel the vehicle by an inertia force. In this case, the fuel cut-off is not carried out to continue fuel combustion of the engine 1 during coasting.

When the increasing amount of vehicle speed $\Delta SPD$ from the initial vehicle speed $SPD_0$ of point to as the starting point of the neutral coasting reaches the first reference value $\Delta spd1$ at point t1, the clutch 7 is brought into engagement to terminate the neutral coasting control while carrying out the fuel cut-off of the engine 1. In addition, the intake valves and exhaust valves of all of the cylinders 1a of the engine 1 are deactivated. Consequently, the engine braking force resulting from a pumping loss is weakly applied to the vehicle Ve.

The vehicle speed SPD is continuously increased, and when the increasing amount of vehicle speed $\Delta SPD$ reaches the second reference value $\Delta spd2$ at point t2, the intake valves and exhaust valves of half of the cylinders 1a of the engine 1 are deactivated. Consequently, a pumping loss of the engine 1 is increased to a certain extent so that the vehicle Ve is decelerated by an increased engine braking force.

The vehicle speed SPD is further increased and when the increasing amount of vehicle speed $\Delta SPD$ reaches the third reference value $\Delta spd3$ at point t3, the deactivated intake valves and exhaust valves of the cylinders 1a are activated again. In this situation, the fuel cut-off of the engine 1 is carried out while activating the intake valves and the exhaust valves. Consequently, the engine braking force resulting from the pumping loss applied to the vehicle Ve is maximized.

Thus, according to the control examples shown in FIGS. 2 and 4, the neutral coasting control is terminated in accordance with the increasing amount of vehicle speed $\Delta SPD$ while altering the engine braking force applied to the vehicle Ve. To this end, specifically, an engagement of the clutch 7, an execution of the fuel cut-off, and activation of the intake valves and the exhaust valves of the cylinders 1a are controlled in a manner such that the engine braking force applied to the vehicle Ve is increased in proportion to an increment of the increasing amount of vehicle speed $\Delta SPD$. Therefore, even if the vehicle speed SPD is still increased after a commencement of the neutral coasting control, the vehicle Ve is allowed to be decelerated appropriately by the engine braking force adjusted in accordance with an increment of the increasing amount of vehicle speed $\Delta SPD$. For this reason, the driver is allowed to feel appropriate decelerating feeling.

According to the control example shown in FIGS. 2 and 4, number of the activated intake valves and the exhaust valves of the engine 1 is thus changed in accordance with the increasing amount of vehicle speed $\Delta SPD$ after the commencement of the neutral coasting control. Alternatively, according to another control example shown in FIGS. 5 and 6, number of the activated intake valves and the exhaust valves of the engine 1 may also be altered depending on the vehicle speed SPD.

In this case, as shown in FIG. 5, the deceleration demand for the vehicle Ve is estimated in accordance with the vehicle speed after the neutral coasting control. Specifically, if the vehicle speed falls within the low-speed range, the deceleration demand is estimated to be extremely weak. In turn, if the vehicle speed falls within the middle-speed range, the deceleration demand is estimated to be weak or moderate. Further, if the vehicle speed falls within the high-speed range, the deceleration demand is estimated to be strong.

After the deceleration demand is estimated in accordance with the vehicle speed under the neutral coasting, the an engagement of the clutch 7, an execution of the fuel cut-off, and activation of the intake valves and the exhaust valves of the cylinders 1a are controlled in accordance with the estimated deceleration demand. For example, if the estimated deceleration demand is extremely weak, the clutch 7 is brought into disengagement and maintained. In this case, the fuel cut-off of the engine 1 is not executed, and the deactivation of the intake valves and exhaust valves of the engine 1 is also not executed.

If the estimated deceleration demand is weak, the clutch 7 is brought into engagement while executing the fuel cut-off of the engine 1. In this case, the intake valves and the exhaust valves of all of the cylinders 1a are deactivated.

If the estimated deceleration demand is moderate, the clutch 7 is also brought into engagement while executing the fuel cut-off of the engine 1. In this case, the intake valves and the exhaust valves of half of the cylinders 1a are deactivated.

If the estimated deceleration demand is strong, the clutch 7 is also brought into engagement while executing the fuel cut-off of the engine 1. In this case, the deactivation of the intake valves and the exhaust valves of the cylinders 1a will not be executed.

Figure 6:
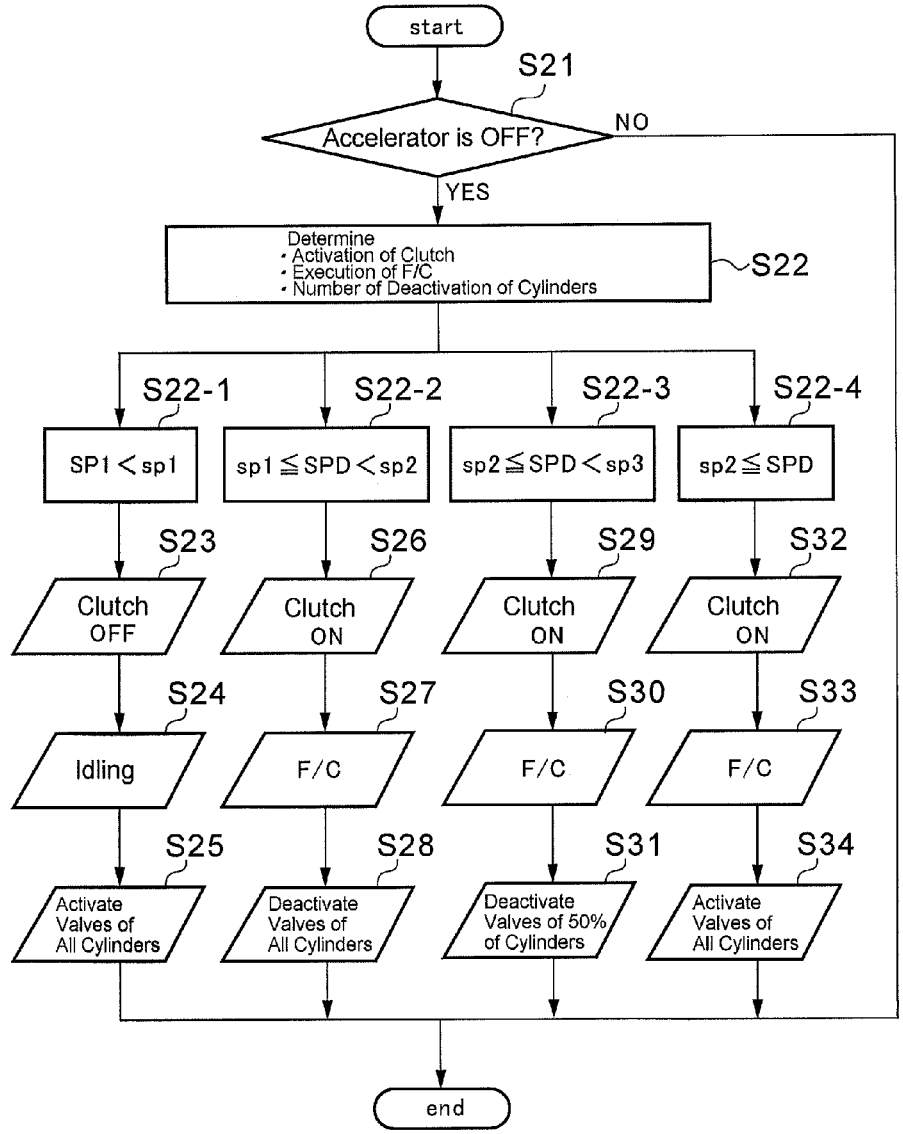
FIG. 6 is a flowchart showing another example of the neutral coasting control carried out by the control system of the present invention.

Another control example is shown in the flowchart of FIG. 6 in more detail. First of all, it is determined whether or not the accelerator is "OFF", that is, whether or not the operating amount of the accelerator is reduced to be zero or smaller than the reference value (at step 21). If the accelerator is not "OFF", that is, if the operating amount of the accelerator is still larger than the reference value so that the answer of the step S21 is NO, the routine is ended without carrying out any specific controls. By contrast, if the accelerator is "OFF", that is, if the operating amount of the accelerator has been reduced to be smaller than the reference value so that the answer of step S21 is YES, the routine advances to step S22 to determine a destination step based on the detected current vehicle speed SPD (at step S22).

Specifically, if the vehicle speed SPD detected at step S22 is lower than a first reference speed spd1, step S22-1 is selected as the destination and the routine further advances to the step S23. If the vehicle speed SPD detected at step S22 is equal to or higher than the first reference speed spd1 but lower than a second reference speed spd2, step S22-2 is selected as the destination and the routine further advances to the step S26. If the vehicle speed SPD detected at step S22 is equal to or higher than the second reference speed spd2 but lower than a third reference speed spd3, step S22-3 is selected as the destination and the routine further advances to the step S29. If the vehicle speed SPD detected at step S22 is equal to or higher than the third reference speed spd3, step S22-4 is selected as the destination and the routine further advances to the step S32.

That is, the first to third reference speeds spd1, spd2 and spd3 are used to determine the vehicle speed during the neutral coasting for the purpose of estimating the deceleration demand based on the vehicle speed. Accordingly, the first reference speed spd1 serves as the "predetermined vehicle speed" of the present invention. The first reference speed spd1 may be determined based on an experiment or simulation result.

Likewise, the second reference speed spd2 is also determined based on an experiment or simulation result to be higher than the first reference speed spd1 but lower than the third reference speed spd3.

The third speed spd3 is also determined based on an experiment or simulation result to be higher than the second reference speed spd2. Accordingly, the third reference speed spd3 serves as the "predetermined upper limit vehicle speed" of the present invention.

At step S23, the clutch 7 is brought into disengagement, and the engine 1 is idled upon reception of a command signal (at step S24). In this case, the intake and exhaust valves will not be deactivated. Specifically, command signals to keep activating the intake valves and the exhaust valves of all of the cylinders 1a of the engine 1 are outputted (at step S25). Otherwise, no command signals for deactivating the intake valves and the exhaust valves of the engine 1 will not be outputted. In this situation, the clutch 7 is brought into disengagement while lowering the engine speed to the idling speed so that the neutral coasting is commenced.

That is, steps S23, S24 and S25 are carried out under the condition that the vehicle speed is not relatively high after the commencement of the coasting control and that an extremely weak deceleration is supposed to be demanded. Accordingly, the neutral coasting control is continued and the routine is ended.

At step S26, the clutch 7 is brought into engagement, and the fuel cut-off is executed upon reception of a command signal (at step S27). Then, the intake valves and exhaust valves of all of the cylinders 1a of the engine 1 are deactivated upon reception of the command signal (at step S28). Consequently, the clutch 7 is brought into engagement so that the power transmission route between the engine 1 and the drive wheels 2 is connected. Additionally, the fuel cut-off is carried out to stop the combustion of the engine 1, and as a result of thus deactivating all of the intake valves and exhaust valves, a pumping loss of the engine 1 is minimized.

Steps S26, S27 and S28 are carried out under the condition that the vehicle speed is increased slightly after the commencement of the coasting control and that a relatively weak deceleration is supposed to be demanded. In this case, therefore, all of the intake valves and exhaust valves are deactivated so that the engine braking force resulting from a pumping loss is reduced. After the deactivation of the intake and exhaust valves at step S28, the routine is ended.

At step S29, the clutch 7 is also brought into engagement, and the fuel cut-off is also executed upon reception of a command signal (at step S30). Then, the intake valves and exhaust valves of half of the cylinders 1a of the engine 1 are deactivated upon reception of the command signal (at step S31). Consequently, the clutch 7 is brought into engagement so that the power transmission route between the engine 1 and the drive wheels 2 is connected. Additionally, the fuel cut-off is carried out to stop the combustion of the engine 1, and half of the intake valves and exhaust valves are deactivated. Consequently, the pumping loss is averaged between that of the case in which the intake and exhaust valves of all cylinders 1a are deactivated and that of the case in which none of intake valves and exhaust valves of the cylinders 1a are deactivated.

Steps S29, S30 and S31 are carried out under the condition that the vehicle speed is increased to a certain extent after the commencement of the coasting control and that a moderate deceleration is supposed to be demanded. In this case, therefore, the intake and exhaust valves of half of cylinder 1a are deactivated so that the engine braking force resulting from a pumping loss is moderately applied to the vehicle Ve. After the deactivation of half of intake and exhaust valves at step S31, the routine is ended.

Thus, at step S31, half of the cylinder 1a of engine 1 are deactivated by deactivating the intake valves and exhaust valves thereof. However, number of the cylinders 1a to be deactivated may be altered according to need. For example, it is also possible to deactivate one third or of the cylinders 1a by altering number of the intake valves and exhaust valves to be deactivated depending on the estimated deceleration demand.

At step S32, the clutch 7 is also brought into engagement, and the fuel cut-off is also executed upon reception of a command signal (at step S33). A command signals to keep activating the intake valves and the exhaust valves of all of the cylinders 1a of the engine 1 are outputted (at step S34). Otherwise, all command signals for deactivating the intake valves and the exhaust valves of all the cylinders 1a of the engine 1 are cancelled. Consequently, the clutch 7 is brought into engagement so that the power transmission route between the engine 1 and the drive wheels 2 is connected. Additionally, the fuel cut-off is carried out to stop the combustion of the engine 1, and the intake valves and exhaust valves of all of the cylinders 1a are allowed to be actuated. As a result, a pumping loss of the engine 1 is maximized.

Steps S32, S33 and S34 are carried out under the condition that the vehicle speed is increased significantly after the commencement of the coasting control and that a relatively strong deceleration is supposed to be demanded. In this case, therefore, all of the intake valves and exhaust valves are activated so that the engine braking force resulting from a pumping loss of the engine 1 is maximized. After allowing the intake and exhaust valves to be actuated at step S34, the routine is ended.

Thus, according to the another control example shown in FIGS. 5 and 6, the neutral coasting control is terminated in accordance with the vehicle speed SPD while altering the engine braking force applied to the vehicle Ve. To this end, specifically, an engagement of the clutch 7, an execution of the fuel cut-off, and activation of the intake valves and the exhaust valves of the cylinders 1a are controlled in a manner such that the engine braking force applied to the vehicle Ve is increased in proportion to the vehicle speed SPD. Therefore, even if the vehicle speed SPD is still increased after the commencement of the neutral coasting control, the vehicle Ve is allowed to be decelerated appropriately by the engine braking force adjusted in accordance with the vehicle speed. For this reason, the driver is allowed to feel appropriate decelerating feeling.

Thus, according to the foregoing control examples, the engine braking force applied to the vehicle Ve is controlled in accordance with the deceleration demand estimated based on the vehicle speed SPD or the increasing amount of the vehicle speed $\Delta$SPD. Alternatively, the engine braking force applied to the vehicle Ve may also be controlled in accordance with the deceleration demand estimated based on an amount of braking operation or steering operation of the driver, a change in road gradient, weather or temperature, or a distance from a forerunning vehicle etc.

For example, in case of controlling the engine braking force applied to the vehicle Ve based on an amount of braking operation, a deceleration demand is estimated based on an amount of braking operation during the neutral coasting control to adjust the engine braking force depending on the estimated deceleration demand. That is, the controller determines that the deceleration demand is increased with an increase in the amount of a braking operation or a braking time.

In case of controlling the engine braking force applied to the vehicle Ve based on a shift position, a deceleration demand is estimated based on a fact that the shift position is shifted from a drive range to another range during the neutral coasting control to adjust the engine braking force depending on the estimated deceleration demand. In this case, for example, the controller determines that the strong deceleration is demand given that the shift position is shifted from the drive range to a second range.

In case of controlling the engine braking force applied to the vehicle Ve based on a distance from a forerunning vehicle, a deceleration demand is estimated based on a change in the distance from the forerunning vehicle during the neutral coasting control to adjust the engine braking force depending on the estimated deceleration demand. In this case, the controller determines that the strong deceleration is demand given that the distance from the forerunning vehicle is reduced to be shorter than a predetermined distance.

In case of controlling the engine braking force applied to the vehicle Ve based on a road gradient, a deceleration demand is estimated based on a change in the road gradient during the neutral coasting control to adjust the engine braking force depending on the estimated deceleration demand. In this case, the controller determines that the strong deceleration is demand given that the road gradient is steeper than a predetermined gradient.

In case of controlling the engine braking force applied to the vehicle Ve based on a turning radius, a deceleration demand is estimated based on a change in a turning radius, a steering angle or an amount of steering operation of the driver during the neutral coasting control to adjust the engine braking force depending on the estimated deceleration demand. In this case, the controller determines that the strong deceleration is demand given that the turning radius is smaller than a predetermined value, the steering angle is larger than a predetermined degree, or an amount of steering operation of the driver is larger than a predetermined amount.

In case of controlling the engine braking force applied to the vehicle Ve based on a change in running condition such as weather or temperature during the neutral coasting control, a deceleration demand is estimated to adjust the engine braking force depending on the estimated deceleration demand. In this case, the controller determines that the strong deceleration is demand given that a friction coefficient of the road is reduced due to rain or snow or an illuminance reduction resulting from a sudden change in the weather condition or a sunset.

In case that a vehicle speed SPD is lower than the predetermined lower limit speed during the neutral coasting control, the vehicle Ve is decelerated or stopped in priority to improving fuel economy, as the case that the strong deceleration is demanded. In this case, the clutch 7 is brought into engagement while carrying out the fuel cut-off of the engine 1. Additionally, deactivation of the intake valves and the exhaust valves of all of the cylinders 1a is executed.

If an oil temperature of the engine 1 or a temperature of a cooling water is lower than a predetermined temperature, the engine 1 and the automatic transmission 3 have to be warmed promptly. In this case, therefore, the clutch 7 is brought into engagement and the engine speed is raised aggressively.

Thus, according to the present invention, the engine 1 is idled and the clutch device 7 is brought into disengagement to cut-off the power transmission route between the engine 1 and the drive wheels 2 to coast the vehicle Ve, under a condition that the accelerator pedal is not depressed or reduced to be smaller than the predetermined value during running. Therefore, a cruising distance of the vehicle Ve without load can be extended so that the fuel economy can be improved.

According to the present invention, the clutch 7 is brought into engagement to terminate the neutral coasting control, under a condition that the vehicle speed SPD is higher than a predetermined speed or the increasing amount of vehicle speed ΔSPD is larger than a predetermined value during the neutral coasting. In this situation, the fuel cut-off is carried out while deactivating the intake and exhaust valves of cylinders. In this case, deceleration demand for vehicle Ve is estimated in accordance with the vehicle speed SPD or the increasing amount of vehicle speed ΔSPD. Consequently, number of cylinders whose intake valves and exhaust valves is deactivated is controlled based on the estimated deceleration demand so that the engine braking force applied to the vehicle Ve is adjusted. Therefore, an appropriate engine braking force can be applied to the vehicle Ve even if the vehicle speed SPD is continuously increasing under the neutral coasting control. For this reason, the driver or passenger(s) is/are allowed to feel appropriate deceleration under the neutral coasting control without feeling any uncomfortable feeling or fear.

Here will be briefly explained a relation between the foregoing examples and the present invention. The functional means of step S4, S5, S23 and S24 serve as the "execution means" of the invention, and the functional means of step S7 to S17 and S26 to S34 serve as the "deactivation means" of the invention.

The invention claimed is:

1. A vehicle control system, that is applied to a vehicle comprising an engine having a plurality of cylinders, a power transmission route between the engine and drive wheels and a clutch device adapted to selectively connect and disconnect the power transmission route, and that is configured to disconnect the power transmission route during running to allow the vehicle to coast, comprising a controller that is configured to:
   detect a vehicle speed;
   detect an operation of an accelerator by a driver;
   detect a speed of the engine;
   execute a coasting control when an operating amount of the accelerator is reduced to be smaller than a predetermined value during running, by bringing the clutch device into disengagement to disconnect the power transmission route while controlling the engine in a manner such that the engine speed is reduced to be lower than an idling speed that is lower than the engine speed of a case in which the coasting control is not carried out; and
   connect the power transmission route by bringing the clutch device into engagement while stopping fuel supply to the engine and deactivating intake valves and exhaust valves of the cylinders, when the vehicle speed exceeds a reference speed or an increasing amount of the vehicle speed exceeds a reference value.

2. The vehicle control system as claimed in claim 1, wherein the controller is further configured to reduce a number of the intake valves and the exhaust valves of the cylinders to be deactivated with an increase in the vehicle speed.

3. The vehicle control system as claimed in claim 1, wherein the controller is further configured to stop the fuel supply to the engine without deactivating the intake valves and the exhaust valves, when the vehicle speed exceeds an upper limit speed that is higher than the reference speed or an increasing amount of the vehicle speed exceeds a predetermined upper limit value that is larger than the reference value.

4. The vehicle control system as claimed in claim 2, wherein the controller is further configured to stop the fuel supply to the engine without deactivating the intake valves and the exhaust valves, when the vehicle speed exceeds an upper limit speed that is higher than the reference speed or an increasing amount of the vehicle speed exceeds a predetermined upper limit value that is larger than the reference value.

* * * * *